(12) United States Patent
Murao et al.

(10) Patent No.: US 7,620,970 B2
(45) Date of Patent: Nov. 17, 2009

(54) CABLE TELEVISION SYSTEM AND METHOD FOR PROVIDING CABLE TELEVISION SERVICE USING THE SYSTEM

(75) Inventors: Yuji Murao, Tama (JP); Hirokazu Okita, Ayase (JP); Masayuki Fujise, Ebina (JP); Fumihide Kojima, Yokohama (JP)

(73) Assignees: Panasonic Corporation, Osaka (JP); National Institute of Information and Communications Technology Incorporated Administrative Agency, Tokyo (JP)

( * ) Notice: Subject to any disclaimer, the term of this patent is extended or adjusted under 35 U.S.C. 154(b) by 819 days.

(21) Appl. No.: 10/504,735

(22) PCT Filed: Feb. 18, 2003

(86) PCT No.: PCT/JP03/01689

§ 371 (c)(1),
(2), (4) Date: Mar. 17, 2005

(87) PCT Pub. No.: WO03/069906

PCT Pub. Date: Aug. 21, 2003

(65) Prior Publication Data

US 2005/0183126 A1 Aug. 18, 2005

(30) Foreign Application Priority Data

Feb. 18, 2002 (JP) ............................. 2002-040338

(51) Int. Cl.
*H04N 7/16* (2006.01)
*H04N 7/173* (2006.01)
*H04B 7/14* (2006.01)

(52) U.S. Cl. ............................. 725/62; 725/119; 455/16
(58) Field of Classification Search ................. 725/131, 725/73, 75, 76, 62, 119; 455/16
See application file for complete search history.

(56) References Cited

U.S. PATENT DOCUMENTS

| 5,737,363 | A | * | 4/1998 | Dinkins ....................... 375/219 |
| 6,094,427 | A | * | 7/2000 | Yi ............................... 370/331 |
| 6,816,706 | B1 | * | 11/2004 | Hohnstein et al. ............. 455/25 |
| 2002/0059614 | A1 | * | 5/2002 | Lipsanen et al. ............... 725/75 |
| 2002/0119766 | A1 | * | 8/2002 | Bianconi et al. ............. 455/406 |
| 2003/0145328 | A1 | * | 7/2003 | Rabinowitz et al. ........... 725/72 |
| 2005/0028208 | A1 | * | 2/2005 | Ellis et al. ..................... 725/58 |

* cited by examiner

*Primary Examiner*—Brian T Pendleton
*Assistant Examiner*—Jean D Saint Cyr
(74) *Attorney, Agent, or Firm*—Pearne & Gordon LLP

(57) ABSTRACT

Herein are disclosed a cable television system, mobile communication terminal, a relay apparatus, a center apparatus, and a method of providing a cable television service using the system, which enable a user operating a CATV mobile terminal (6) to receive a CATV service regardless of the service area of the CATV station where the user is located. When a vehicle (5) having a CATV mobile terminal (6) mounted thereon moves into a service area of a CATV station (3, 4), the CATV mobile terminal (6) is operated to transmit a log-in request to the CATV station (3, 4). The CATV station (3, 4) is operated to inquire about the user to the subscriber station (2), and the subscriber station (2) is operated to judge whether or not the user is authentic. Subscriber station (2) is operated to deliver common contents to the CATV mobile terminal (6) through the CATV station (3, 4) when it is judged that the user is authentic.

8 Claims, 7 Drawing Sheets

FIG.5

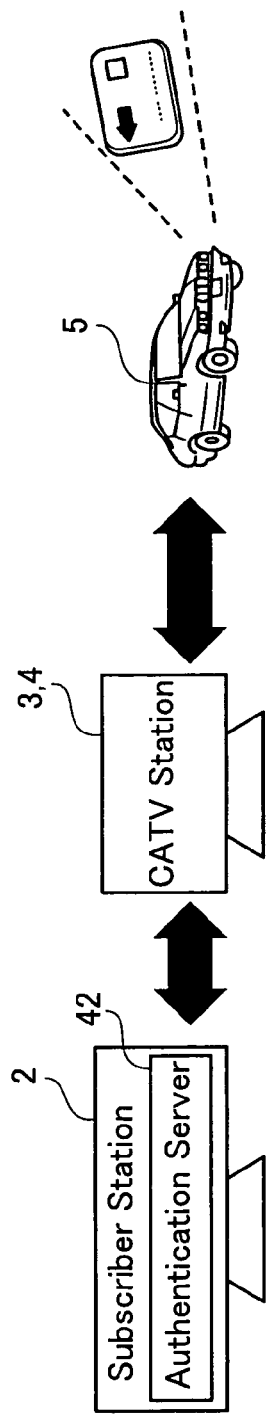

| Function | Authentication Server | CATV Station | Mobile Terminal | IC Card |
|---|---|---|---|---|
| | User Authentication and Accounting Record Management | Providing CATV Service related to Connection, but not Delivering Common Contents | User Terminal | Storage Medium having User Authentication Data Stored therein |
| Communication Flow | | | ←Log-in Request | |
| | User ID Request→ | | | |
| | | | | ←User ID User Information |
| | | | ←Authentication Request | |
| | User Authentication→ | | | |
| | Service Start→ | | | |
| | | | ←Accounting Service Request | |
| | Accounting Service is Permitted→ | | | |
| | Accounting Service Start→ | | | |

CABLE TELEVISION SYSTEM AND METHOD FOR PROVIDING CABLE TELEVISION SERVICE USING THE SYSTEM

TECHNICAL FIELD OF INVENTION

The present invention relates to a cable television system, a relay apparatus, a center apparatus, and a method of providing a cable television service, which enable a mobile communication terminal to receive common contents delivered from a center apparatus through a relay apparatus installed in a service area even though the mobile communication terminal moves from one service area to another service area.

BACKGROUND ART

Up until now, there have been proposed a wide variety of systems for providing a cable television service, hereinlater simply referred to as "CATV service". The CATV service includes a television broadcasting service provided from a plurality of cable television stations for a fringe and local area, and a service for a connection with a computer communication network such as for example an internet.

The broadcasting programs of this CATV service include contents concerning a weather forecast, traffic information, a program of an event, music, a movie, and the like. A user subscribes to a cable television station, hereinlater simply referred to as "CATV station" in a service area where he or she lives, to have a dedicated connection line laid from the CATV station to his or her room. The user receives the contents through the dedicated line, and pays a fee charged in exchange for the contents to the CATV station.

The conventional CATV system, however, encounters a drawback that the user cannot receive the contents from the CATV station using a mobile communication terminal such as, for example, CATV mobile mounted on a vehicle resulting from the fact that the user receives the contents through the dedicated line.

The conventional CATV system encounters another drawback that the user cannot receive any CATV service when the user moves into a service area other than the service area of the CATV station to which the user has subscribed resulting from the fact that the user subscribes to the CATV station in the related service area.

It is, therefore, an object of the present invention to provide a system which makes it possible for a user to receive contents from the CATV station using a mobile communication terminal regardless of whether or not the user moves into a service area other than the service area of the CATV station to which the user has subscribed.

The present invention is made with a view to overcoming the above mentioned drawbacks and is directed to a cable television system, a relay apparatus, a center apparatus, and a cable television providing method, which enable a mobile communication terminal to receive common contents delivered from a center apparatus through each of a plurality of relay apparatuses respectively installed in a plurality of service areas even though the mobile communication terminal moves from one service area to another service area.

DISCLOSURE OF THE INVENTION

According to one aspect of the present invention, there is provided a cable television system, comprising: a mobile communication terminal mounted on a movable object and capable of establishing a connection with a cable television service line by wireless; a plurality of relay apparatuses respectively installed in a plurality of service areas, and each of the relay apparatuses being operative to deliver common contents concerning a cable television service to the mobile communication terminal located within each of the service areas; and a center apparatus connected with each of the relay apparatuses through a communication line, for delivering common contents to the relay apparatuses by way of multicast communication, and in which the mobile communication terminal located within a service area is operative to transmit a log-in request to the relay apparatus installed in the service area by wireless, the relay apparatus is operative to transmit user identification information of the mobile communication terminal and specifying information for specifying the relay apparatus to the center apparatus, the center apparatus is operative to transmit authentication information to the relay apparatus, which have transmitted the specifying information, when the user identification information is valid, upon receiving the specifying information, the relay apparatus is operative to start a cable television service for the mobile communication terminal on the basis of the authentication information, upon receiving the authentication information, the mobile communication terminal is operative to transmit request information for common contents to the relay apparatus, the relay apparatus is operative to transmit a request for delivering common contents to the center apparatus, upon receiving the request information for common contents from the mobile communication terminal, and the center apparatus is operative to deliver common contents to the mobile communication terminal through the relay apparatus and store therein and manage delivery history information indicative of a history of delivering contents, in response to the request for delivering common contents from the relay apparatus.

In accordance with the above construction, in the cable television system according to the present invention, the mobile communication terminal is operative to transmit a log-in request to the relay apparatus in the event that the movable object having the mobile communication terminal mounted thereon moves into the service area of the relay apparatus, the relay apparatus is operative to transmit an authentication request to the center apparatus, and the center apparatus is operative to deliver common contents (music, a movie, news, a weather forecast, a variety program, and the like) to the mobile communication terminal when the user is judged to be authentic. The cable television system thus constructed makes it possible for the mobile communication terminal to receive common contents from the center apparatus even though the mobile communication terminal moves from one service area to another service area of any one of the relay apparatuses.

In addition, a plurality of relay apparatuses are connected with the center apparatus through a communication line. The fact that each of the relay apparatuses can deliver common contents to the mobile communication terminal through the communication line leads to the facts that the need of dedicated lines connecting the center apparatus with the relay apparatuses is eliminated, and each of the relay apparatuses can easily communicate with the mobile communication terminal through the center apparatus.

Further, the center apparatus is operative to judge whether or not the user identification information is authentic, and deliver the common contents stored therein to the mobile communication terminal through the relay apparatuses, thereby enabling the center apparatus to manage all of the delivery history information in association with user identification information.

Still further, the center apparatus can deliver the contents by way of multicast communication. This leads to the fact that the center apparatus and the relay apparatuses can utilize IP services such as for example an internet, thereby effectively utilizing the network resource potentially present in the communication line.

In the cable television system according to the present invention, the user identification information may be constituted by personal information stored in an IC (integrated circuit) card or a magnetic card.

In accordance with the above construction, the center apparatus can easily identify the user even though the user operates a plurality of mobile communication terminals as well as authenticate the validity of the user on the basis of the personal information (e.g., ID), thereby protecting the common contents from unauthorized use.

In the cable television system according to the present invention, the center apparatus may be operative to perform an accounting process on the basis of the delivery history information indicative of delivering the common contents.

In accordance with the above construction, the center apparatus can manage all of the delivery history information and the relay apparatuses are not required to perform the accounting process, thereby improving the efficiency of the accounting process.

According to another aspect of the present invention, there is provided a relay apparatus, installed in a service area and connected with a center apparatus through a communication line, for delivering common contents concerning a cable television service received from the center apparatus to a mobile communication terminal mounted on a movable object located within the service area, the relay apparatus comprises: first receiving means for receiving the log-in request when the mobile communication terminal transmit a log-in request from the mobile communication terminal by wireless; transmitting means for transmitting user identification information of the mobile communication terminal and specifying information for specifying the relay apparatus, which has received the log-in request and the user identification information, to the center apparatus upon receiving the log-in request; second receiving means for receiving authentication information from the center apparatus when the user identification information is valid; service providing means for starting a cable television service for the mobile communication terminal on the basis of the authentication information; common content request means for transmitting a request for delivering common contents to the center apparatus, upon receiving request information for common contents from the mobile communication terminal; and delivering means for delivering common contents received from the center apparatus to the mobile communication terminal.

In accordance with the above construction, in the cable television system according to the present invention, the mobile communication terminal is operative to transmit a log-in request to the relay apparatus in the event that the movable object having the mobile communication terminal mounted thereon moves into the service area of the relay apparatus, the relay apparatus is operative to transmit an authentication request to the center apparatus, and the center apparatus is operative to deliver common contents (music, a movie, news, a weather forecast, a variety program, and the like) to the mobile communication terminal when the user is judged to be authentic. The cable television system thus constructed makes it possible for the mobile communication terminal to receive common contents from the center apparatus even though the mobile communication terminal moves from one service area to another service area of any one of the relay apparatuses.

In addition, a plurality of relay apparatuses are connected with the center apparatus through a communication line. The fact that each of the relay apparatuses can deliver common contents to the mobile communication terminal through the communication line leads to the facts that the need of dedicated lines connecting the center apparatus with the relay apparatuses is eliminated, and each of the relay apparatuses can easily communicate with the mobile communication terminal through the center apparatus.

In the relay apparatus according to the present invention, the user identification information may be constituted by personal information stored in an IC (integrated circuit) card or a magnetic card.

In accordance with the above construction, the center apparatus can easily identify the user even though the user operates a plurality of mobile communication terminals as well as authenticate the validity of the user on the basis of the personal information (e.g., ID), thereby protecting the common contents from unauthorized use.

According to a further aspect of the present invention, there is provided a center apparatus for delivering common contents to a plurality of relay apparatuses respectively installed in a plurality of service areas by way of multicast communication so that each of the relay apparatuses delivers common contents concerning a cable television service to a mobile communication terminal located within each of the service areas, the center apparatus comprising: first receiving means for receiving user identification information and specifying information for specifying the relay apparatus; specific information storage means for storing therein personal information on user; transmitting means for judging whether or not the user identification information is authentic by comparing the personal information stored in the specific information storage means with the user identification information and transmitting authentic information to the relay apparatus specified by the specifying information when it is judged that the user identification information is authentic; second receiving means for receiving a request for delivering common contents from the relay apparatus; and delivering means for delivering common contents to the mobile communication terminal through the relay apparatus upon receiving the request for delivering common contents from the relay apparatus.

In accordance with the above construction, in the cable television system according to the present invention, the mobile communication terminal is operative to transmit a log-in request to the relay apparatus in the event that the movable object having the mobile communication terminal mounted thereon moves into the service area of the relay apparatus, the relay apparatus is operative to transmit an authentication request to the center apparatus, and the center apparatus is operative to deliver common contents (music, a movie, news, a weather forecast, a variety program, and the like) to the mobile communication terminal when the user is judged to be authentic. The cable television system thus constructed makes it possible for the mobile communication terminal to receive common contents from the center apparatus even though the mobile communication terminal moves from one service area to another service area of any one of the relay apparatuses.

In addition, a plurality of relay apparatuses are connected with the center apparatus through a communication line. The fact that each of the relay apparatuses can deliver common contents to the mobile communication terminal through the communication line leads to the facts that the need of dedicated lines connecting the center apparatus with the relay apparatuses is eliminated, and each of the relay apparatuses can easily communicate with the mobile communication terminal through the center apparatus.

Further, the center apparatus is operative to judge whether or not the user identification information is authentic, and deliver the common contents stored therein to the mobile communication terminal through the relay apparatuses, thereby enabling the center apparatus to manage all of the delivery history information in association with user identification information.

Still further, the center apparatus can deliver the contents by way of multicast communication. This leads to the fact that the center apparatus and the relay apparatuses can utilize IP services such as for example an internet, thereby effectively utilizing the network resource potentially present in the communication line.

The center apparatus according to the present invention may further comprise storage means for storing therein delivery history information indicative of a history of delivering the contents; and accounting means for performing an accounting process on the basis of the delivery history information stored in the storage means.

In accordance with the above construction, the center apparatus can manage all of the delivery history information and the relay apparatuses are not required to perform the accounting process, thereby improving the efficiency of the accounting process.

In the center apparatus according to the present invention, the user identification information may be constituted by personal information stored in an IC (integrated circuit) card or a magnetic card.

In accordance with the above construction, the center apparatus can easily identify the user even though the user operates a plurality of mobile communication terminals as well as authenticate the validity of the user on the basis of the personal information (e.g., ID), thereby protecting the common contents from unauthorized use.

According to a still further aspect of the present invention, there is provided a method of providing a cable television service of providing a cable television service to a mobile communication terminal through a relay apparatus from a center apparatus, comprising; (a) preparing a mobile communication terminal mounted on a movable object and capable of establishing a connection with a cable television service line by wireless; a plurality of relay apparatuses respectively installed in a plurality of service areas, and each of the relay apparatuses being operative to deliver common contents concerning a cable television service to the mobile communication terminal located within each of the service areas; and a center apparatus connected with each of the relay apparatuses through a communication line, for delivering common contents to the relay apparatuses by way of multicast communication; (b) transmitting a log-in request to the relay apparatus installed in the service area by wireless, by the mobile communication terminal; (c) transmitting user identification information of the mobile communication terminal and specifying information for specifying the relay apparatus to the center apparatus, by the relay apparatus; (d) transmitting authentication information to the relay apparatus, which have transmitted the specifying information, when the user identification information is valid, upon receiving the specifying information, by the center apparatus; (e) starting a cable television service for the mobile communication terminal on the basis of the authentication information, by the relay apparatus; (f) transmitting request information for common contents to the relay apparatus, by the mobile communication terminal; (g) transmitting a request for delivering common contents to the center apparatus, upon receiving the request information for common contents from the mobile communication terminal, by the relay apparatus; (h) delivering common contents to the mobile communication terminal through the relay apparatus in response to the request for delivering common contents from the relay apparatus, by the center apparatus; and (i) storing therein and managing delivery history information indicative of a history of delivering contents.

In accordance with the above method, the mobile communication terminal is operative to transmit a log-in request to the relay apparatus in the event that the movable object having the mobile communication terminal mounted thereon moves into the service area of the relay apparatus, the relay apparatus is operative to transmit an authentication request to the center apparatus, and the center apparatus is operative to deliver common contents (music, a movie, news, a weather forecast, a variety program, and the like) to the mobile communication terminal when the user is judged to be authentic. The cable television system thus constructed makes it possible for the mobile communication terminal to receive common contents from the center apparatus even though the mobile communication terminal moves from one service area to another service area of any one of the relay apparatuses.

In addition, a plurality of relay apparatuses are connected with the center apparatus through a communication line. The fact that each of the relay apparatuses can deliver common contents to the mobile communication terminal through the communication line leads to the facts that the need of dedicated lines connecting the center apparatus with the relay apparatuses is eliminated, and each of the relay apparatuses can easily communicate with the mobile communication terminal through the center apparatus.

Further, the center apparatus is operative to judge whether or not the user identification information is authentic, and deliver the common contents stored therein to the mobile communication terminal through the relay apparatuses, thereby enabling the center apparatus to manage all of the delivery history information in association with user identification information.

Still further, the center apparatus can deliver the contents by way of multicast communication. This leads to the fact that the center apparatus and the relay apparatuses can utilize IP services such as for example an internet, thereby effectively utilizing the network resource potentially present in the communication line.

In the method of providing a cable television service according to the present invention, the user identification information may be constituted by personal information stored in an IC (integrated circuit) card or a magnetic card.

In accordance with the above construction, the center apparatus can easily identify the user even though the user operates a plurality of mobile communication terminals as well as authenticate the validity of the user on the basis of the personal information (e.g., ID), thereby protecting the common contents from unauthorized use.

In the method of providing a cable television service, the step (i) may have a step of performing an accounting process on the basis of the delivery history information indicative of delivering the common contents. In accordance with the above construction, the center apparatus can manage all of the delivery history information and the relay apparatuses are not required to perform the accounting process, thereby improving the efficiency of the accounting process.

Further more, the relay apparatuses may have respective own original contents, and transmit the original contents to one another, and the CATV mobile terminal may obtain contents delivered not only from the subscriber station but also from the CATV stations, to which the user has not subscribed.

BRIEF DESCRIPTION OF THE DRAWINGS

The features and advantage of a cable television system and a method of providing a cable television service using the system according to the present invention will become apparent as the description proceeds when taken in conjunction with the accompanying drawings.

FIG. 5 is a diagram showing flows of user authentication and accounting processes performed in the preferred embodiments of the cable television system, the relay apparatus, the center apparatus, and the cable television service providing method according to the present invention.

BEST MODE OF CARRYING OUT THE PRESENT INVENTION

The preferred embodiment of the present invention will be described hereinafter with reference to the drawings.

FIGS. 1 through 5 are diagrams showing preferred embodiments of a cable television system, a relay apparatus, a center apparatus, and a cable television service providing method according to the present invention.

Figure 1:
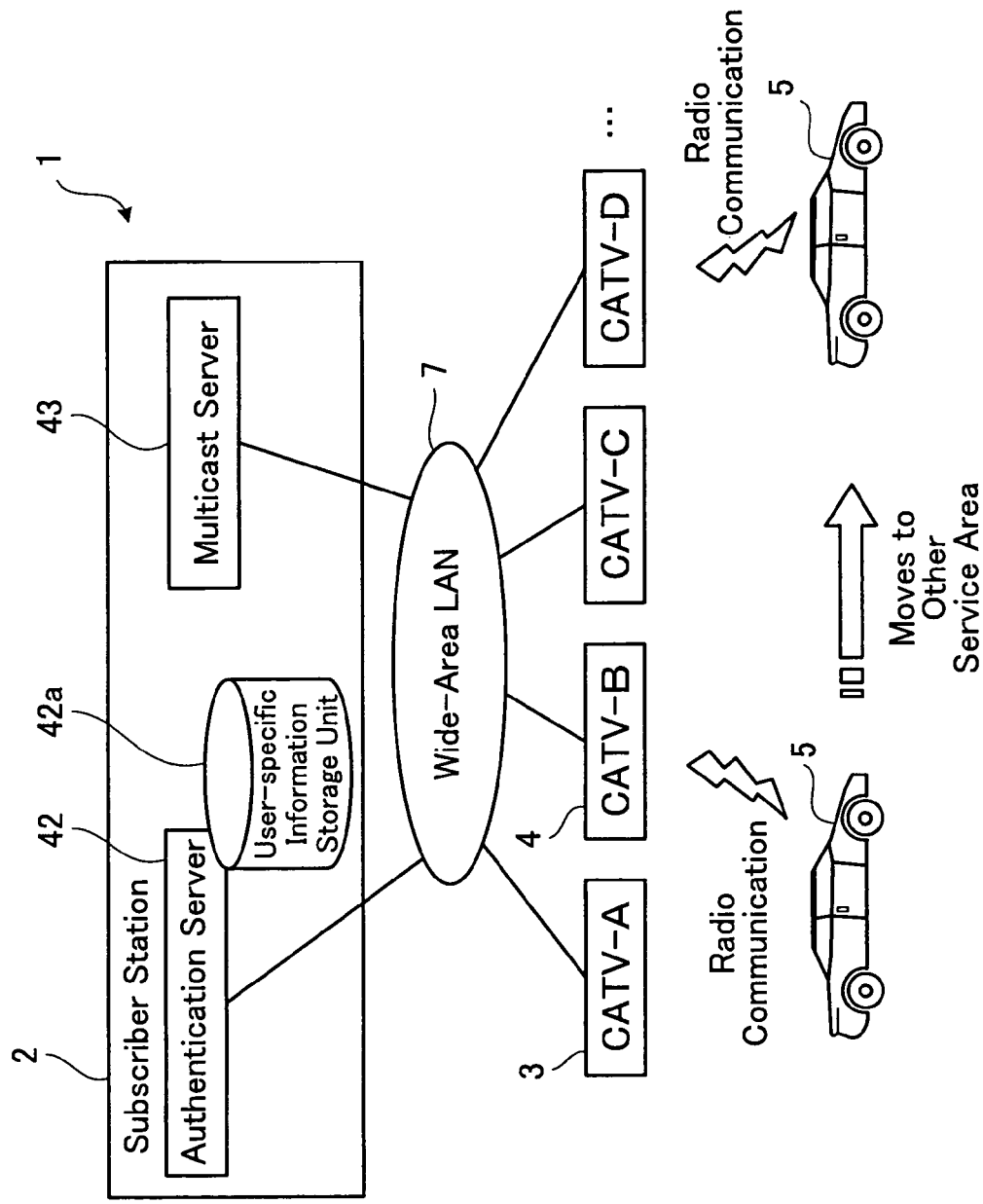
FIG. 1 is a schematic diagram showing preferred embodiments of a cable television system, a relay apparatus, a center apparatus, and a cable television service providing method according to the present invention.
Figure 2:
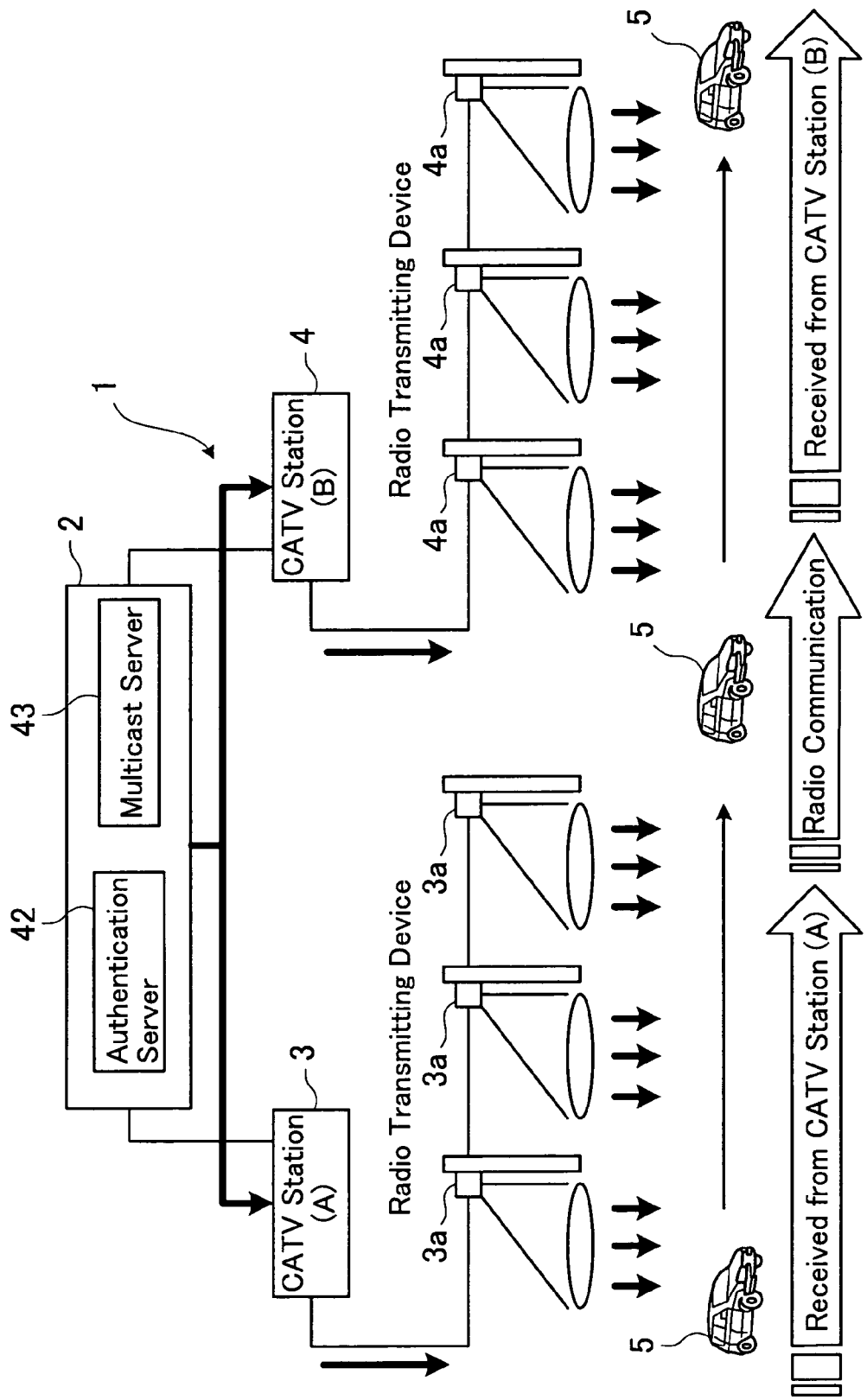
FIG. 2 is a block diagram showing routes through which the contents are delivered in the preferred embodiments of the cable television system, the relay apparatus, the center apparatus, and the cable television service providing method according to the present invention.

The construction will be described first. The cable television system is shown in FIGS. 1 and 2 to bear a reference numeral 1 and comprises a subscriber station (center apparatus) 2, CATV stations, i.e., a CATV-A, a CATV-B, a CATV-C, and a CATV-D for delivering contents concerning a cable television service under the control of the subscriber station 2, a CATV mobile terminal (mobile communication terminal) 6 mounted on a vehicle (movable object) 5 and receiving the contents from the CATV-A (hereinlater referred to as "CATV station 3"), a CATV-B (hereinlater referred to as "CATV station 4"), a CATV-C, and a CATV-D. The subscriber station 2 is connected with the CATV stations 3 and 4 through a communication line 7 such as for example a leased line, a dedicated line, a wide-area LAN, or the like. The communication line 7 permits the subscriber station 2, the CATV stations 3, 4, and other stations to communicate with one another at high speed by way of multicast communication.

While there are shown four CATV stations in FIG. 1, the cable television system 1 may, in reality, comprise more than four CATV stations. In FIG. 2, there are shown only two CATV stations, namely, the CATV stations 3 and 4, for the purpose of simplifying the description and assisting in understanding about the whole operation.

As best shown in FIG. 2, the CATV stations 3 and 4 respectively comprise a plurality of radio transmitting and receiving devices 3a and 4a installed in respective service areas as communication lines, thereby making it possible for the CATV stations 3 and 4 to deliver the contents (music, a movie, news, a weather forecast, a variety program, and the like) to the CATV mobile terminal 6 located within their respective service areas.

Figure 3:
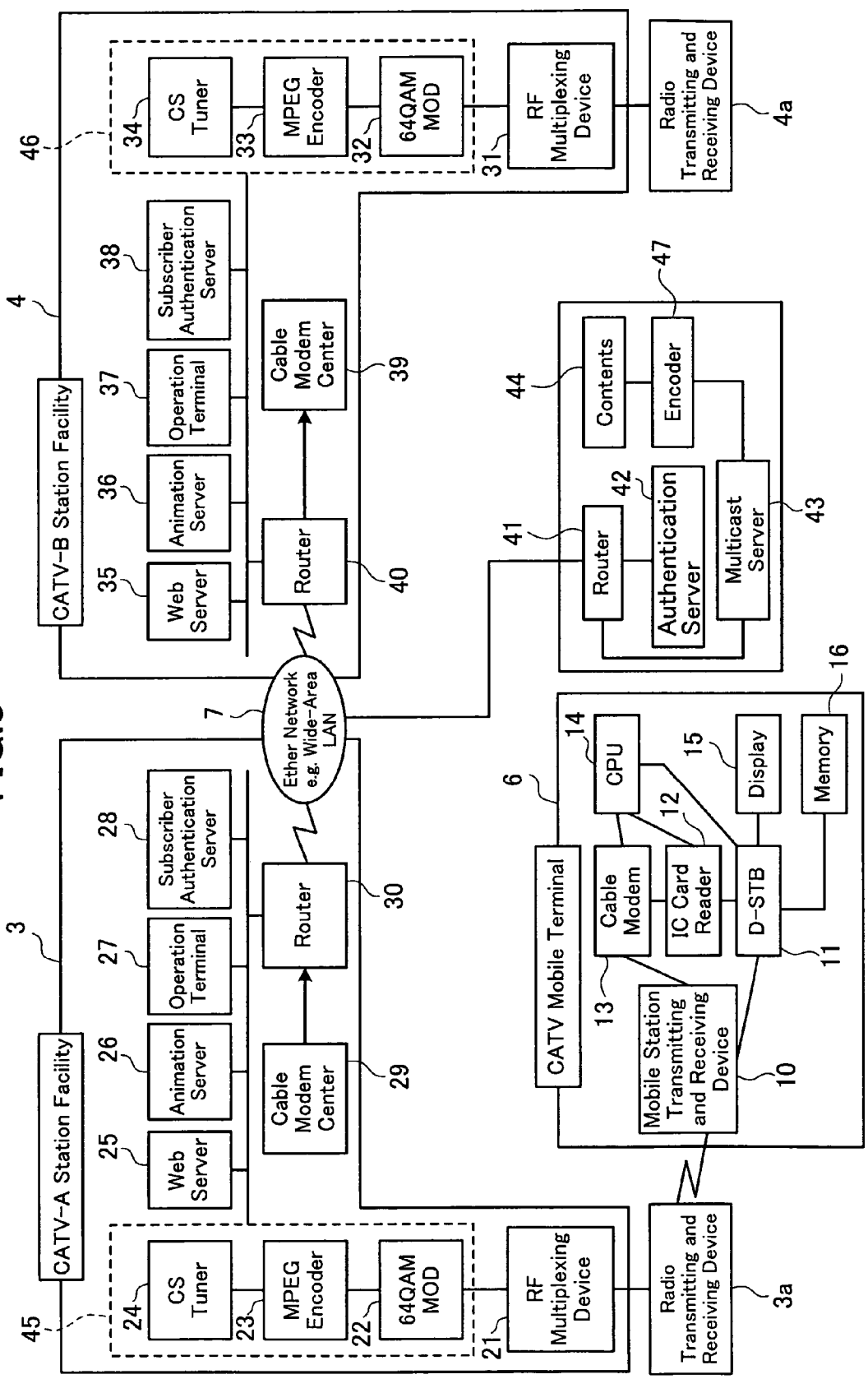
FIG. 3 is a block diagram showing the relay apparatus, the center apparatus, and the mobile communication terminal forming part of the preferred embodiments of the cable television system, the relay apparatus, the center apparatus, and the cable television service providing method according to the present invention.

The CATV mobile terminal 6 is shown in FIG. 3 comprising a mobile station transmitting and receiving device 10, a digital set top box (D-STB) 11, an IC card reader (reading and writing means) 12, a cable modem 13, a CPU (personal computer) 14, a display 15, and a memory 16.

The mobile station transmitting and receiving device 10 is designed to transmit and receive a signal with each of the radio transmitting and receiving devices 3a and 4a when entered into the service area of each of the CATV stations 3 and 4 to ensure that the CATV mobile terminal 6 communicates with each of the CATV stations 3 and 4 by wireless. The D-STB 11 is designed to process the signals received and transmitted with each of the radio transmitting and receiving devices 3a and 4a to perform bidirectional communications.

The IC card reader 12 is designed to have an IC card inserted thereinto, and read out, as user identification information, ID, personal information (e.g., a bank account, an address), and the like from the IC card. The user identification information is transmitted by the D-STB 11 to the radio transmitting and receiving device 3a and/or 4a through the mobile station transmitting and receiving device 10.

The cable modem 13 is adapted to demodulate the contents data contained in the signal received by the mobile station transmitting and receiving device 10. The contents thus demodulated are reproduced by the display 15.

The CPU 14 is adapted to control the whole operation of the CATV mobile terminal 6. The CPU 14 is operative to control, for example, the IC card reader 12 to have the IC card reader 12 read out from the IC card the user identification information to be outputted therethrough. Further, the CPU 14 is operative to control the mobile station transmitting and receiving device 10 to have the mobile station transmitting and receiving device 10 transmits a log-in request when the vehicle 5 moves into a service area of the CATV station 3 or 4.

The memory 16 is adapted to store therein utilization history information indicative of a history of utilizing the contents received from the CATV station 3 or CATV station 4 in response to instructions from the CPU 14.

The CATV stations 3 and 4 respectively comprises radio frequency (RF) multiplexing devices 21 and 31, CATV image transmitting devices 45 and 46, Web servers 25 and 35, animation servers 26 and 36, operation terminals 27 and 37, subscriber authentication servers 28 and 38, cable modem centers 29 and 39, and routers 30 and 40.

The radio frequency (RF) multiplexing devices 21 and 31 are adapted to establish radio communications with the CATV mobile terminal 6 respectively through the radio transmitting and receiving devices 3a and 4a.

The CATV image transmitting devices 45 and 46 are adapted to deliver contents of digital image in the format such as for example MPEG format through CATV lines. The CATV image transmitting devices 45 and 46 are respectively constituted by CS tuners 24 and 34 for receiving image data, MPEG encoders 23 and 33 for compressing the image data, and 64 QAM modulators (QAM MOD) 22 and 32 for modulating the image data compressed by the MPEG encoders 23 and 33 into data signals of a predetermined format to be delivered through the CATV lines. The data signals thus delivered are later converted into images by the D-STB of the CATV mobile terminal. In the present embodiment, the CS tuners 24 and 34 may transfer to the MPEG encoders 23 and 33 the image data stored in a video tape, optical disc, or the like.

The Web servers 25 and 35 are connectable with an internet, and adapted to deliver and obtain various contents through the internet. The animation servers 26 and 36 are adapted to input the contents of animation data such as for example a movie, music, a weather forecast, and news from the subscriber station 2, and deliver the contents thus inputted to the CATV mobile terminal 6. The operation terminals 27 and 37 are adapted to permit a user to operate various functions of the CATV stations 3 and 4.

The subscriber authentication servers 28 and 38 are adapted to store therein user's personal information (e.g., ID and accounting information). When the CATV mobile terminal 6 is located in the service area of each of the CATV stations 3 and 4 and transmits a log-in request, each of the subscriber authentication servers 28 and 38 is operative to select the user's personal information corresponding to the CATV mobile terminal 6 from among the user's personal information stored therein, and request the subscriber station 2 to start an authentication process on the user identification information.

Each of the routers 30 and 40 is connected with the wide-area LAN 7 and adapted to carry out predetermined protocols and communicate with the subscriber station 2 and other CATV stations through the wide-area LAN 7.

In the present embodiment, the subscriber authentication servers 28 and 38 are operative to receive the log-in request through the routers 30 and 40 when the CATV mobile terminal 6 transmits a log-in request to the CATV stations 3 and 4 by wireless. The subscriber authentication server and the router constitute first receiving means.

Further, in the present embodiment, the subscriber authentication server 28 or 38 is operative to transmit user identification information and specifying information (IP address) for specifying the CATV station 3 or 4, which has received the log-in request, to the subscriber station 2 through the router 30 or 40 upon receiving the log-in request from the CATV mobile terminal 6 through the radio transmitting and receiving device 3a or 4a. The subscriber authentication server and the router constitute transmitting means.

The subscriber authentication servers 28 and 38 are adapted to receive authentication information from the subscriber station 2 through the routers 30 and 40 when the user identification information is judged to be valid by the subscriber station 2, which will be described later. The subscriber authentication server and the router constitute second receiving means.

Further, the animation servers 26 and 36 are operative to start a cable television service for the CATV mobile terminal 6 on the basis of the authentication information received by the subscriber authentication servers 28 and 38. The animation server constitutes service providing means. The service provided by the CATV station 3 or 4 for the CATV mobile terminal 6 includes a list of contents such as for example music and news to be delivered from the subscriber station 2 to the CATV mobile terminal 6, and an IP address, a port number, and the like required to establish a connection with the subscriber station 2.

In the CATV mobile terminal 6, the display 15 is operative to display the list of contents upon receiving a list of contents from the CATV station 3 or 4, the CPU 14 is operative to allow the user to select desired contents from the list, and transmit content request information indicative of the desired contents to the CATV station 3 or 4.

In the CATV station 3 or 4, upon receiving the content request information indicative of the desired contents from the CATV mobile terminal 6, the subscriber authentication server 28 or 38 is operative to transmit an IGMP (Internet Group management Protocol) connection request to the subscriber station 2 through the router 30 or 40 on the basis of the content request information under the condition that the content request information includes the IP address and the port number required to obtain the desired contents. In the present embodiment, the subscriber authentication server and the router constitute common content request means.

The animation servers 26 and 36 are operative to start delivering the desired contents to the CATV mobile terminal 6 by wireless through the radio frequency (RF) multiplexing devices 21 and 31 and the radio transmitting and receiving devices 3a and 4a immediately in response to the content request information from the CATV mobile terminal 6.

The subscriber station 2 comprises a router 41, an authentication server 42, a multicast server 43, and a content managing unit 44, and an encoder 47.

The router 41 is connected with a wide-area LAN 7 and adapted to carry out predetermined protocols and communicate with the CATV stations 3 and 4 through the wide-area LAN 7.

The authentication server 42 includes a user-specific information storage unit (database) 42a having stored therein user's personal information (ID, a CATV station which the user has subscribed to, an accounting record, a bank account, an address, and the like) and delivery history information indicative of a history of delivering the contents (see FIG. 1). The user-specific information storage unit 42a constitutes specific information storage means.

The authentication server 42 is adapted to receive user identification information and an IP address specifying the CATV station 3 or 4 from the CATV station 3 or 4 through the router 41. The authentication server 42 and the router 41 constitute first receiving means. The authentication server 42 is operative to judge whether or not the user identification information is authentic by comparing the personal information stored in the user-specific information storage unit 42a with the user identification information received from the CATV station 3 or 4, and transmit authentic information to the CATV station 3 or 4 specified by the IP address when it is judged that the user identification information is authentic. The authentication server 42 and the router 41 constitute transmitting means.

The multicast server 43 is adapted to receive a request for delivering common contents from the CATV station 3 or 4 through the router 41. In the present embodiment, the multicast server 43 and the router 41 constitute second receiving means. Upon receiving the request for delivering common contents, the encoder 47 is operative to compress the common contents (music, a movie, news, a weather forecast, a variety program, and the like) managed by the content managing unit 44, and the multicast server 43 is operative to transmit the common contents thus compressed to the CATV mobile terminal 6 through the CATV station 3 or 4 by way of multicast communication. The multicast server 43 and the router 41 constitute delivering means.

Furthermore, the authentication server 42 is operative to store therein delivery history information indicative of a history of delivering the contents delivered by the multicast server 43 in association with user's IDs and IP addresses of the CATV stations 3 and 4, and perform an accounting process on the basis of the delivery history information thus stored. In the present embodiment, the authentication server 42 constitutes accounting means.

While it has been described in the present embodiment appearing in FIG. 2 that the subscriber station 2 comprises an authentication server 42 and a multicast server 43, however, the cable television system 1 according to the present invention is not limited to the present embodiment. Either one of the authentication server 42 and the multicast server 43 may be mounted on the CATV station 3 or the CATV station 4, or installed separately from the subscriber station 2 and the CATV stations 3 and 4.

Figure 4:
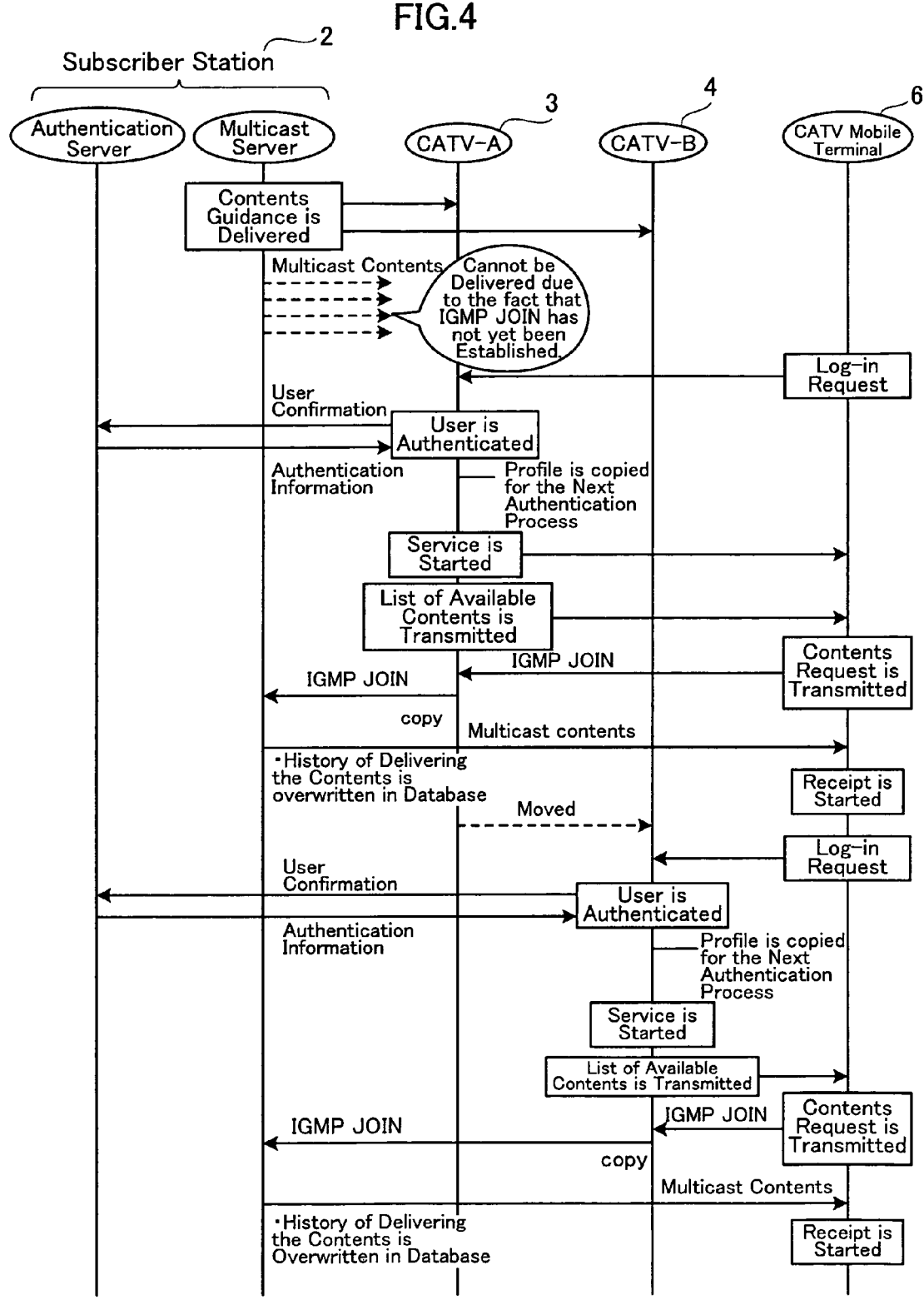
FIG. 4 is a diagram showing flows of delivering common contents in the preferred embodiments of the cable television system, the relay apparatus, the center apparatus, and the cable television service providing method according to the present invention.

The method of providing a cable television service will be described hereinlater with reference to FIGS. 4 and 5. FIG. 4 is a flowchart showing a flow of delivering common contents. FIG. 5 is a flow chart showing flows of user authentication and accounting processes performed while the common contents are delivered.

As shown in FIGS. 4 and 5, the multicast server 43 of the subscriber station 2 is operated to deliver contents guidance information indicative of available contents to the CATV stations 3 and 4. The subscriber station 2 has not yet established an IGMP connection (IGMP JOIN) with the CATV stations 3 and 4. Accordingly, the multicast contents can not be delivered to the CATV stations 3 and 4.

When the vehicle 5 having the CATV mobile terminal 6 mounted thereon moves into the CATV station 3 (hereinlater referred to as "CATV-A"), the CATV mobile terminal 6 is operated to transmit a log-in request to the CATV-A.

The CATV-A is operated to transmit a signal notifying the log-in request to the subscriber station 2. The subscriber station 2 is operated to transmit a signal requesting for user identification information (user ID) of the CATV mobile terminal 6 to the CATV-A. The CATV-A is operated to transmit a signal requesting for the user identification information to the CATV mobile terminal 6.

The CATV mobile terminal 6 is operated to transmit an authentication request signal with the user identification information (ID) read out by the ID card reader 12 to the CATV-A. The CATV-A is operated to transmit the authentication request signal with the user identification information to the subscriber station 2.

The subscriber station 2 is operated to judge whether or not the user identification information is authentic by comparing the personal information stored in the user-specific information storage unit 42a with the user identification information received from the CATV-A, and transmit authentic information to the CATV-A when it is judged that the user identification information is authentic. More specifically, the subscriber station is operated to judge whether or not the user has subscribed to any one of the CATV stations connected with the subscriber station 2 and never failed to pay fee for the CATV service while comparing the personal information stored in the user-specific information storage unit 42a with the user identification information received from the CATV-A. The user is judged to be authentic under the condition that the user has subscribed to any one of the CATV stations connected with the subscriber station 2 and never failed to pay fee for the CATV service.

The CATV-A is operated to start a cable television service for the CATV mobile terminal 6. The CATV-A is operated to transmit to the CATV mobile terminal 6 authentication information (e.g., local IP address) required to establish a connection with the subscriber station 2, and a list of contents available for the CATV mobile terminal 6.

The CATV mobile terminal 6 is operated to select desired contents from the list, and transmit content request information indicative of the desired contents to the CATV-A.

Upon receiving the content request information from the CATV mobile terminal 6, the CATV-A is operated to transmit an IP address and a port number corresponding to the content request information, and an IGMP (Internet Group management Protocol) connection request to the subscriber station 2.

The subscriber station 2 is operated to establish an IGMP connection with the CATV-A: The multicast server 43 of the subscriber station 2 is operated to deliver the multicast contents to the CATV mobile terminal 6 through the CATV-A, and store delivery history information indicative of a history of delivering the contents in the user-specific information storage unit 42a.

Upon receiving a request for the accounting service from the CATV mobile terminal 6, the CATV-A is operated to transfer the request for the accounting service to the subscriber station 2. In the subscriber station 2, the authentication server 42 is operated to perform an accounting process on the basis of the delivery history information stored in the user-specific information storage unit 42a. The subscriber station 2 is operated to transmit the result of the accounting process to the CATV-A, and the CATV-A is then operated to transmit the accounting information to the CATV mobile terminal 6.

When, on the other hand, the vehicle 5 having the CATV mobile terminal 6 mounted thereon moves into the CATV station 4 (hereinlater referred to as "CATV-B"), the CATV mobile terminal 6 is operated to transmit a log-in request to the CATV-B.

The CATV-B is operated to transmit a signal notifying the log-in request to the subscriber station 2. The subscriber station 2 is operated to transmit a signal requesting for user identification information (user ID) of the CATV mobile terminal 6 to the CATV-B. The CATV-B is operated to transmit a signal requesting for the user identification information to the CATV mobile terminal 6.

The CATV mobile terminal 6 is operated to transmit an authentication request signal with the user identification information (ID) read out by the ID card reader 12 to the CATV-B. The CATV-B is operated to transmit the authentication request signal with the user identification information to the subscriber station 2.

The subscriber station 2 is operated to judge whether or not the user identification information is authentic by comparing the personal information stored in the user-specific information storage unit 42a with the user identification information received from the CATV-B, and transmit authentic information to the CATV-B when it is judged that the user identification information is authentic.

The CATV-B is operated to start a cable television service for the CATV mobile terminal 6. The CATV-B is operated to transmit to the CATV mobile terminal 6 authentication information (e.g., local IP address) required to establish a connection with the subscriber station 2, and a list of contents available for the CATV mobile terminal 6.

The CATV mobile terminal 6 is operated to select desired contents from the list, and transmit content request information indicative of the desired contents to the CATV-B.

Upon receiving the content request information from the CATV mobile terminal 6, the CATV-B is operated to transmit an IP address and a port number corresponding to the content request information, and an IGMP (Internet Group management Protocol) connection request to the subscriber station 2.

The subscriber station 2 is operated to establish an IGMP connection with the CATV-B. The multicast server 43 of the subscriber station 2 is operated to deliver the multicast contents to the CATV mobile terminal 6 through the CATV-B and store delivery history information indicative of a history of delivering the contents in the user-specific information storage unit 42*a*.

Upon receiving a request for the accounting service from the CATV mobile terminal 6, the CATV-B is operated to transfer the request for the accounting service to the subscriber station 2. In the subscriber station 2, the authentication server 42 is operated to perform an accounting process on the basis of the delivery history information stored in the user-specific information storage unit 42*a*. The subscriber station 2 is operated to transmit the result of the accounting process to the CATV-B, and the CATV-B is then operated to transmit the accounting information to the CATV mobile terminal 6.

When the vehicle 5 having the CATV mobile terminal 6 mounted thereon, then, moves into the CATV-C, the CATV-D, . . . , or the CATV-n, the same processes will be repeated.

As will be seen from the foregoing description, it is to be understood that the CATV mobile terminal 6 is operative to transmit a log-in request to the CATV station 3 or 4 in the event that the vehicle 5 having the CATV mobile terminal 6 mounted thereon moves into the service area of the CATV station 3 or 4, the CATV-station 3 or 4 is operative to transmit an authentication request with the user identification information of the CATV mobile terminal 6 to the subscriber station 2, and the subscriber station 2 is operative to deliver common contents to the CATV mobile terminal 6 when the user is judged to be authentic. The cable television system 1 thus constructed makes it possible for the CATV mobile terminal 6 to receive common contents from the subscriber station 2 even though the CATV mobile terminal 6 moves from one service area to another service area of any one of the CATV stations 3 and 4.

Especially, when common contents are delivered to the CATV mobile terminal through a plurality of affiliated CATV stations, all of the affiliated CATV stations are required to manage delivery history information indicative of a history of delivering contents separately from one another, and operations, accordingly, tend to be overlapped among the affiliated CATV stations. In the present embodiment, although the common contents are delivered to the CATV mobile terminal 6 through a plurality of CATV stations 3 and 4, the subscriber station 2 is operative to manage all of the delivery history information. This leads to the fact that the CATV stations 3 and 4 are not required to manage the delivery history information, but simply serve as relay stations, thereby drastically reducing the operations overlapped among the subscriber station 2, the CATV stations 3 and 4.

In addition, according to the present invention, a plurality of CATV stations 3 and 4 are connected with the subscriber station 2 through the wide-area LAN 7. The fact that each of the CATV stations 3 and 4 can deliver common contents to the CATV mobile terminal 6 through the wide-area LAN 7 leads to the facts that the need of laying dedicated lines connecting the subscriber station 2 with CATV stations 3 and 4 is eliminated, and that the communication between each of the CATV stations 3 and 4 and the CATV mobile terminal 6 through the subscriber station 2 is greatly facilitated.

Further, according to the present invention, the subscriber station 2 is operative to judge whether or not the user identification information (ID) is authentic, and deliver the common contents stored therein to the CATV mobile terminal 6 through the CATV stations 3 and 4, thereby enabling the subscriber station 2 to manage all of the delivery history information in association with user identification information.

Still further, according to the present invention, the subscriber station 2, the CATV stations 3, and 4 can communication with one another by way of multicast communication through the wide-area LAN 7. This leads to the fact that the subscriber station 2, the CATV stations 3, and 4 can utilize various IP services such as for example an internet access, thereby effectively utilizing the network resource potentially present in the wide-area LAN 7.

In the present embodiment, as the user identification information is used personal information stored in an IC (integrated circuit) card. The subscriber station 2 thus constructed can identify the user even though the user operates a plurality of CATV mobile terminals 6 as well as authenticate the validity of the user on the basis of the personal information (e.g., ID), thereby protecting the common contents from unauthorized use.

Especially, the conventional CATV system in which each of the CATV stations 3 and 4 is operative to authenticate the validity of the user, and separately manage delivery history information indicative of a history of delivered contents, each of the CATV stations is required to assign a local ID to the CATV mobile terminal 6 whenever the CATV mobile terminal 6 moves to the service area of each of the CATV stations, thereby complicating the management of the user information. In the case that as the user identification information is used ID of the CATV mobile terminal 6, the CATV mobile terminal 6 cannot be protected from unauthorized use in the event that the CATV mobile terminal 6 is stolen.

In the present embodiment as the user identification information is used personal information stored in an IC (integrated circuit) card, and the subscriber station 2 manages all of the delivery history information, thereby simplifying user management as well as protecting the CATV mobile terminal 6 from unauthorized use. The personal information may be stored in a magnetic card in place of the IC card.

In addition, in the present embodiment, the subscriber station 2 is operative to perform an accounting process on the basis of the delivery history information indicative of delivering the contents. The fact that the subscriber station 2 manages all of the delivery history information leads to the fact that the CATV stations 3 and 4 are not required to perform the accounting process, thereby improving the efficiency of operations related to the accounting process.

Figure 6:
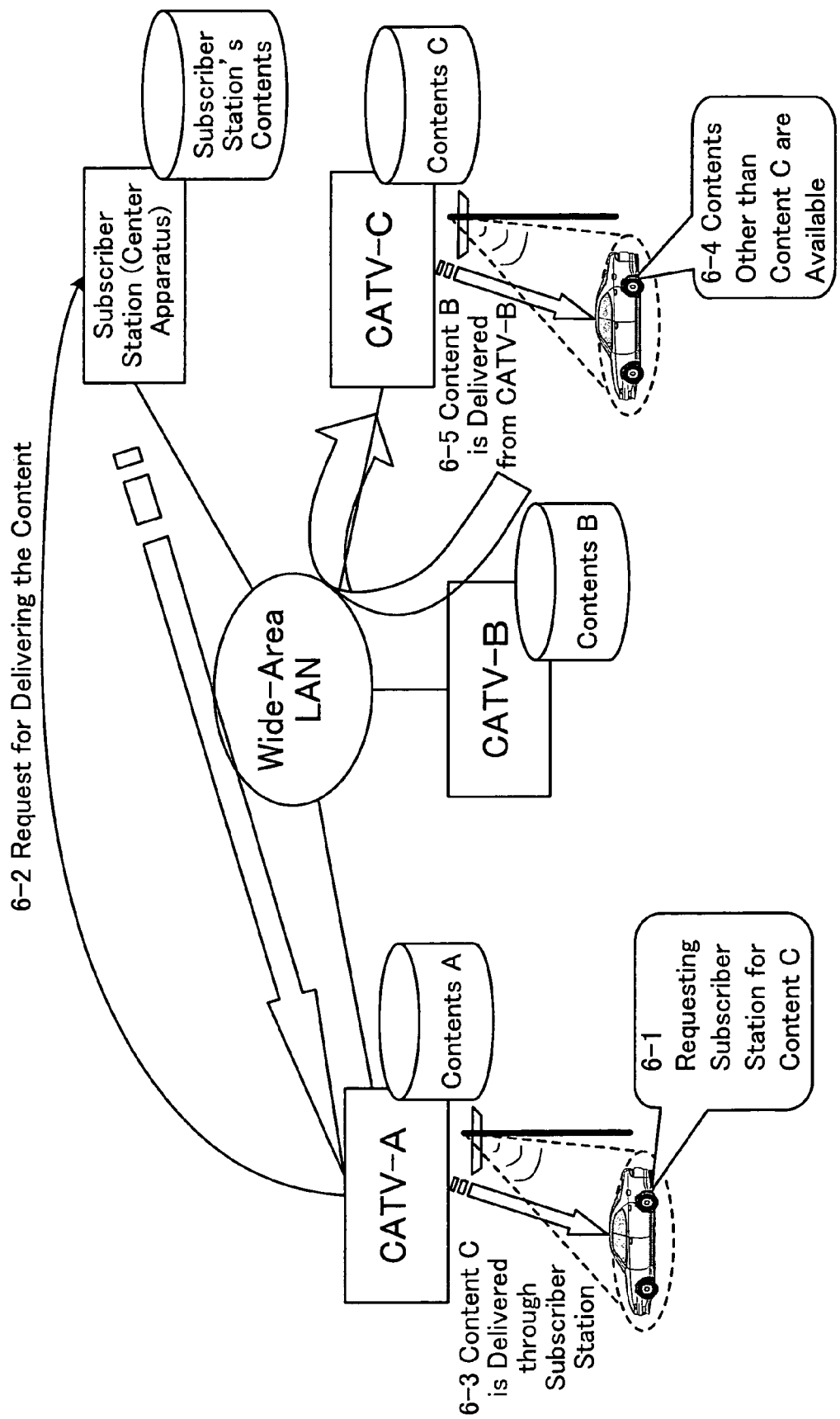
FIG. 6 is a schematic diagram showing preferred embodiments of a cable television system, a relay apparatus, a center apparatus, and a cable television service providing method according to the present invention.
Figure 7:
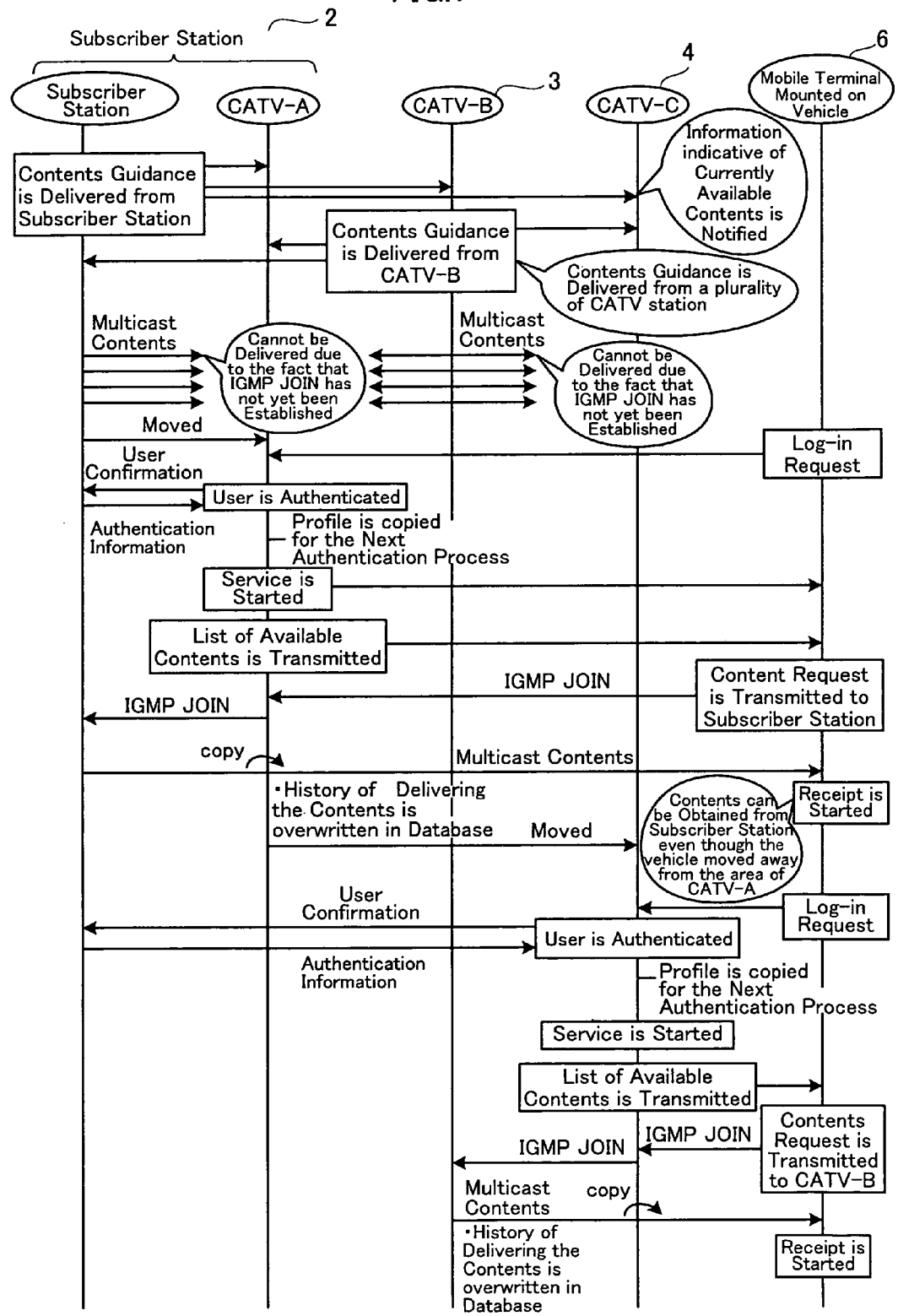
FIG. 7 is a diagram showing flows of delivering common contents in the preferred embodiments of the cable television system, the relay apparatus, the center apparatus, and the cable television service providing method according to the present invention.

Further, according to the present invention, each of the CATV stations may comprise a multicast server as shown in FIGS. 6 and 7. The cable television system thus constructed makes it possible for the CATV mobile terminal moved into a service area of, for example, the CATV-A, to still receive the contents delivered from, for example, the CATV-C other than the CATV-A through the subscriber station 2.

Still further, according to the present invention, the subscriber station may be replaced by an authentication station or content delivery station, which performs all the operations related to content delivery, authentication, and accounting processes.

Further the more, while it has been described in the present embodiment that the CATV mobile terminal obtains contents delivered from the subscriber station and the CATV stations to which the user of the CATV mobile terminal has subscribed, according to the present invention, the CATV mobile terminal may obtain contents delivered from the CATV stations, to which the user has not subscribed.

Further the more, while it has been described in the present embodiment that the subscriber station is connected with the CATV stations, preferably, through a wide-area LAN, according to the present invention, the subscriber station may be connected with the CATV stations through any other network such as for example, leased lines or dedicated lines.

INDUSTRIAL APPLICABILITY

The present invention can provide a cable television system, a relay apparatus, a center apparatus, and a cable television service providing method, which makes it possible for a user to receive a cable television service from a relay apparatus when the user is located in a service area of any one of the relay apparatuses.

The invention claimed is:

1. A cable television system, comprising:
   a mobile communication terminal mounted on a movable object;
   a plurality of relay apparatuses installed in respective service areas, and connected to one another through a communication line, said relay apparatuses having respective original contents concerning a cable television service, and being operative to transmit said original contents to one another through said communication line; and
   a center apparatus connected with each of said relay apparatuses through said communication line, said center apparatus being operative to deliver common contents concerning a cable television service to said relay apparatuses through said communication line, and in which
   said mobile communication terminal is capable of establishing, by wireless, a connection with a relay apparatus installed in a service area which said movable object is in, and transmits a log-in request to said relay apparatus installed in a service area which said movable object is in,
   said relay apparatus receives said log-in request from said mobile communication terminal, and transmits user identification information of said mobile communication terminal and specifying information of said relay apparatus which has received said log-in request,
   said center apparatus transmits authentication information to said relay apparatus, which has transmitted said specifying information, when said user identification information is valid, upon receiving said specifying information,
   said relay apparatus, which has received said authentication information from said center apparatus, starts a cable television service for said mobile communication terminal on the basis of said authentication information,
   when said mobile communication terminal transmits a request for delivering common contents to said relay apparatus installed in a service area which said movable object is in, said relay apparatus, installed in a service area which said movable object is in, transmits a request for delivering common contents to said center apparatus, upon receiving said request for common contents from said mobile communication terminal,
   said center apparatus delivers said common contents to said mobile communication terminal through said relay apparatus installed in a service area which said movable object is in, and store therein and manage delivery history information indicative of a history of delivering contents, in response to said request for delivering common contents,
   said relay apparatus, which has original contents concerning a cable television service subscribed by a user, delivers said original contents to said mobile communication terminal through said relay apparatus installed in a service area which said movable object is in, when said mobile communication terminal transmits a request for delivering said original contents to said relay apparatus installed in a service area which said movable object is in.

2. A cable television system as set forth in claim 1, in which said user identification information is constituted by personal information stored in an IC (integrated circuit) card or a magnetic card.

3. A cable television system as set forth in claim 1 or claim 2, in which
   said center apparatus is operative to perform an accounting process on the basis of said delivery history information indicative of delivering said common contents.

4. A relay apparatus installed in a service area and connected with a center apparatus through a communication line, said relay apparatus having original contents concerning a cable television service, said center apparatus having common contents concerning a cable television service, said relay apparatus comprises:
   first receiving means for receiving a log-in request from a mobile communication terminal;
   transmitting means for transmitting user identification information of said mobile communication terminal and specifying information of a relay apparatus which has received said log-in request and said user identification information;
   second receiving means for receiving authentication information from said center apparatus when said user identification information is valid;
   service providing means for starting a cable television service for said mobile communication terminal on the basis of said authentication information;
   common content request means for transmitting a request for delivering common contents to said center apparatus, upon receiving request for common contents from said mobile communication terminal; and
   delivering means for delivering common contents received from said center apparatus to said mobile communication terminal, wherein
   said relay apparatus, which has original contents concerning a cable television service subscribed by user, delivers said original contents to said mobile communication terminal through said relay apparatus installed in a service area which said movable object is in, when said mobile communication terminal transmits a request for delivering said original contents to said relay apparatus installed in a service area which said movable object is in.

5. A relay apparatus as set forth in claim 4, in which said user identification information is constituted by personal information stored in an IC (integrated circuit) card or a magnetic card.

6. A method of providing a cable television service to a mobile communication terminal, comprising:
   (a) preparing a mobile communication terminal mounted on a movable object; a plurality of relay apparatuses installed in respective service areas, and connected to one another through a communication line, said relay apparatuses having respective original contents concerning a cable television service, and being operative to transmit said original contents to one another through said communication line; and a center apparatus connected with each of said relay apparatuses through a communication line;

(b) transmitting a log-in request to said relay apparatus installed in a service area which said movable object is in, by said mobile communication terminal;

(c) transmitting user identification information of said mobile communication terminal and specifying information of said relay apparatus which has received said log-in request, by said relay apparatus;

(d) transmitting authentication information to said relay apparatus, which has transmitted said specifying information, when said user identification information is valid, upon receiving said specifying information, by said center apparatus;

(e) starting a cable television service for said mobile communication terminal on the basis of said authentication information, by said relay apparatus;

(f) transmitting a request for delivering common contents to said relay apparatus, by said mobile communication terminal;

(g) transmitting a request for delivering common contents to said center apparatus, upon receiving said request for delivering common contents from said mobile communication terminal, by said relay apparatus;

(h) delivering common contents to said mobile communication terminal through said relay apparatus installed in a service area which said movable object is in, in response to said request for delivering common contents from said relay apparatus, by said center apparatus;

(i) storing therein and managing delivery history information indicative of a history of delivering contents; and (j) delivering original contents to said mobile communication terminal through said relay apparatus installed in a service area which said movable object is in, when said mobile communication terminal transmits a request for delivering said original contents to said relay apparatus installed in a service area which said movable object is in.

7. A method of providing a cable television service as set forth in claim 6, in which
said user identification information is constituted by personal information stored in an IC (integrated circuit) card or a magnetic card.

8. A method of providing a cable television service as set forth in claim 6 or claim 7, in which
said step (i) has a step of performing an accounting process on the basis of said delivery history information indicative of delivering said common contents.

* * * * *

UNITED STATES PATENT AND TRADEMARK OFFICE
CERTIFICATE OF CORRECTION

PATENT NO.       : 7,620,970 B2                                     Page 1 of 1
APPLICATION NO.  : 10/504735
DATED            : November 17, 2009
INVENTOR(S)      : Murao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1162 days.

Signed and Sealed this

Twenty-sixth Day of October, 2010

David J. Kappos
*Director of the United States Patent and Trademark Office*